Oct. 21, 1958   K. R. LUNG   2,857,081
GAS SEPARATING AND PUMPING DEVICES
Filed Feb. 9, 1953   8 Sheets-Sheet 1

INVENTOR.
KENNETH R. LUNG
BY Toulmin & Toulmin
ATTORNEYS

Oct. 21, 1958 K. R. LUNG 2,857,081
GAS SEPARATING AND PUMPING DEVICES
Filed Feb. 9, 1953 8 Sheets-Sheet 2
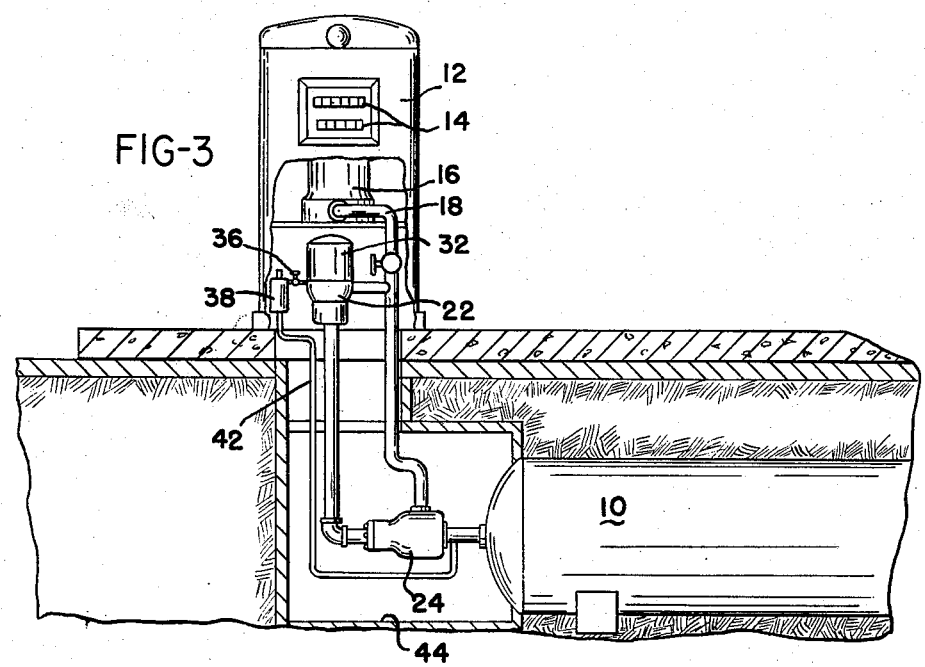
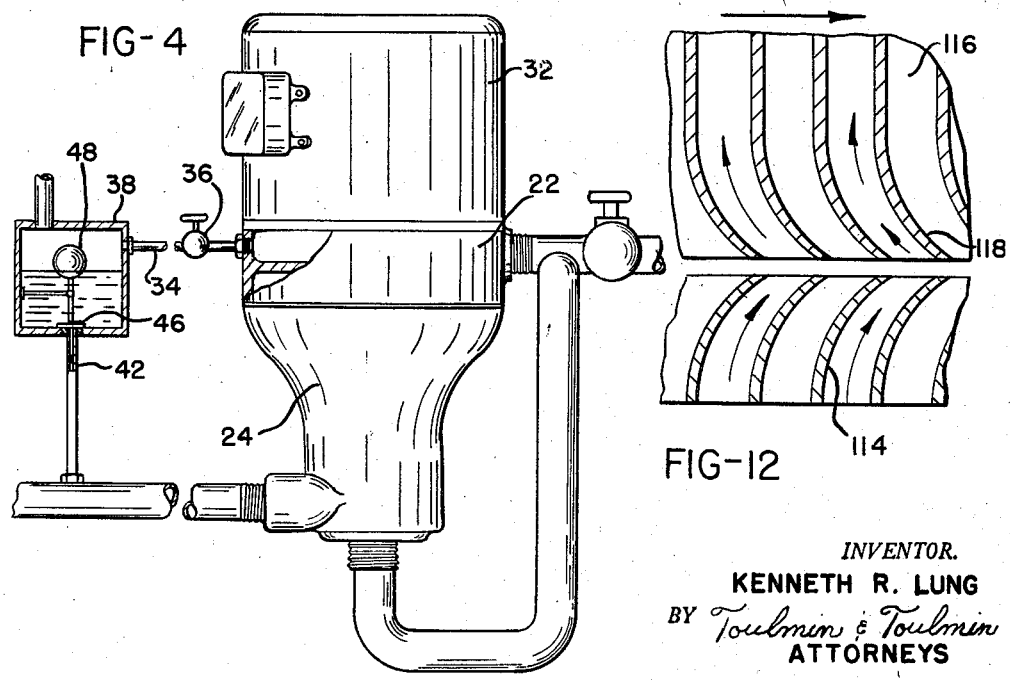
INVENTOR.
KENNETH R. LUNG
BY Toulmin & Toulmin
ATTORNEYS

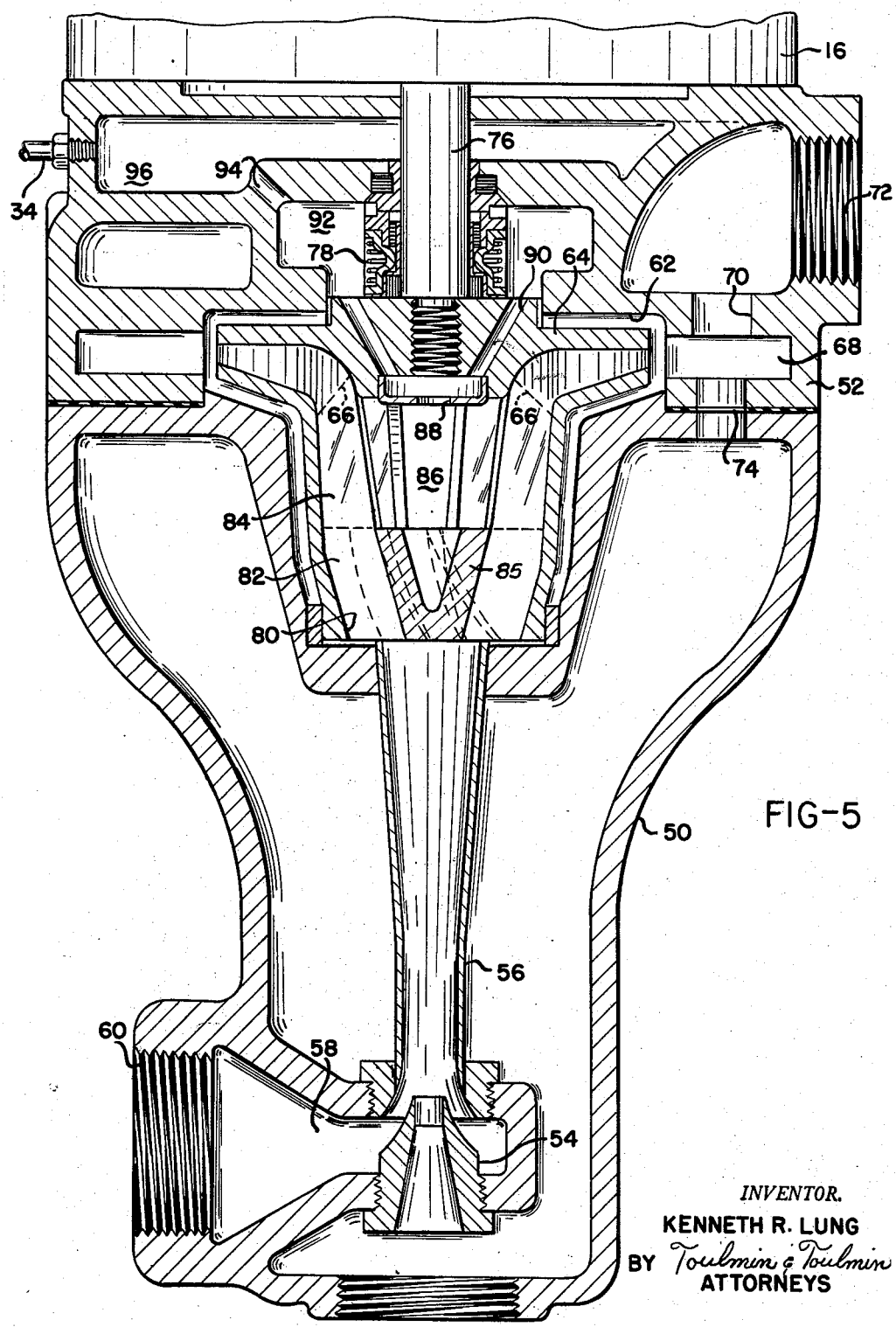

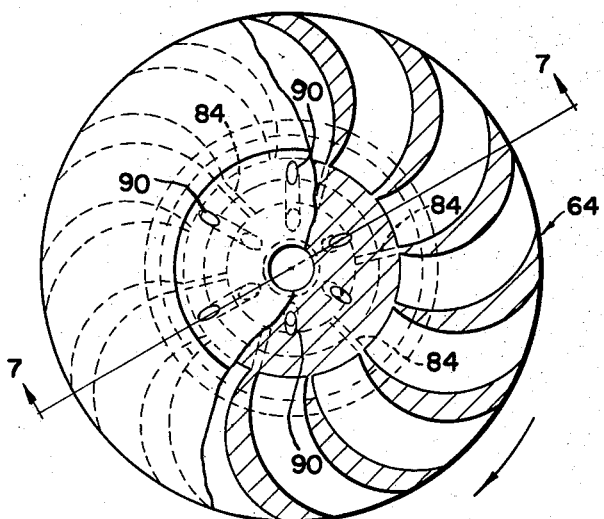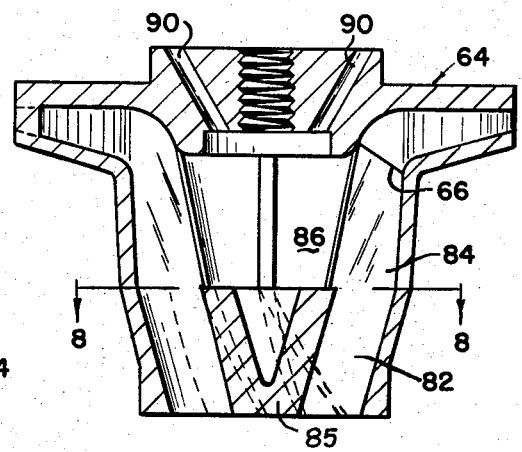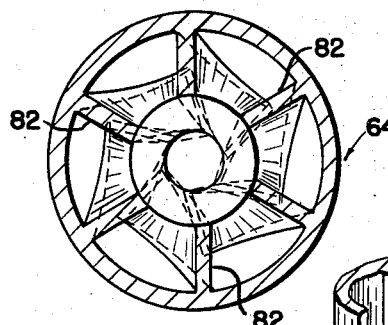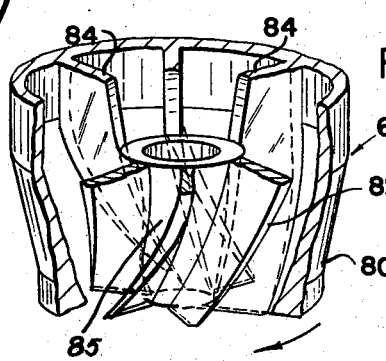

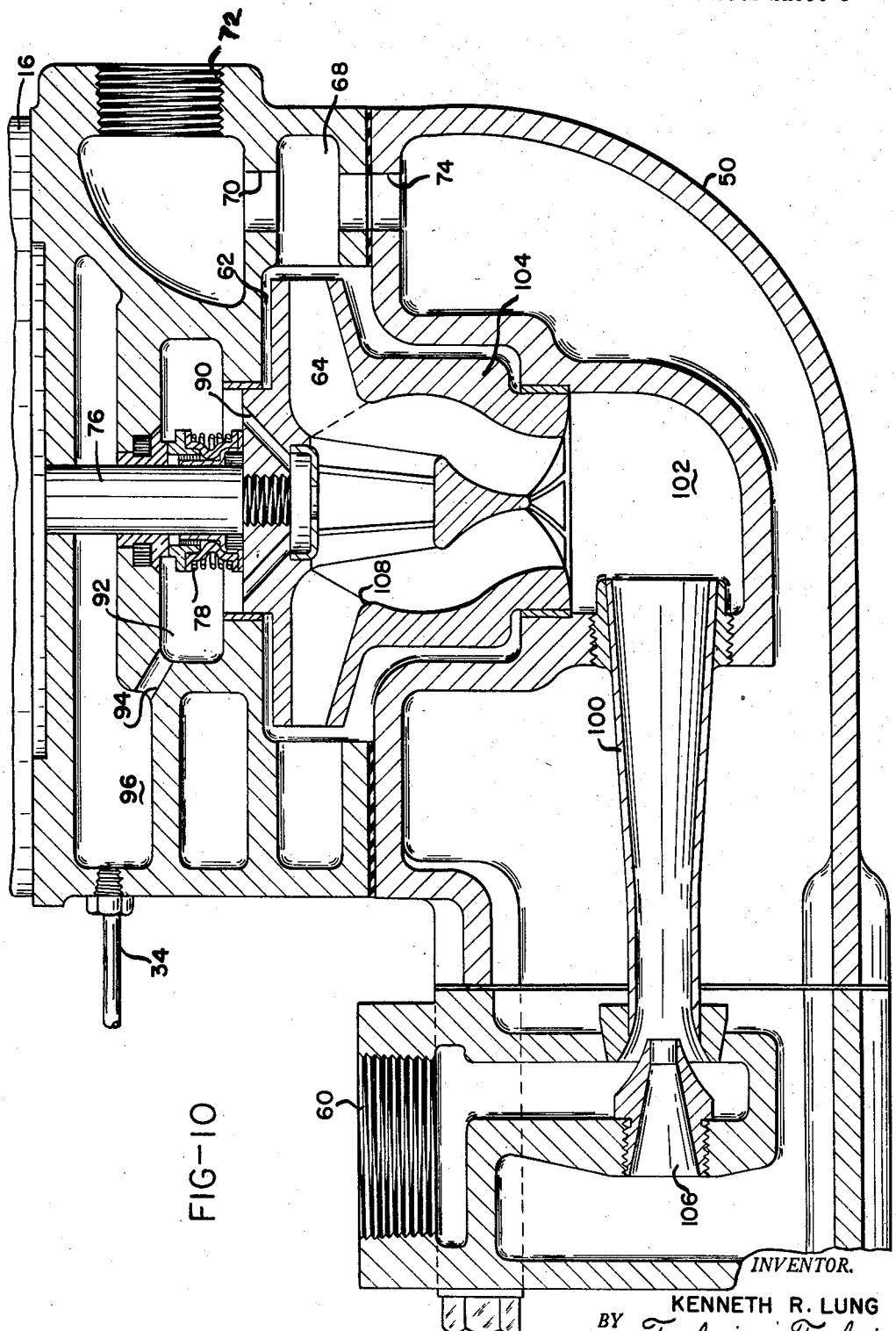

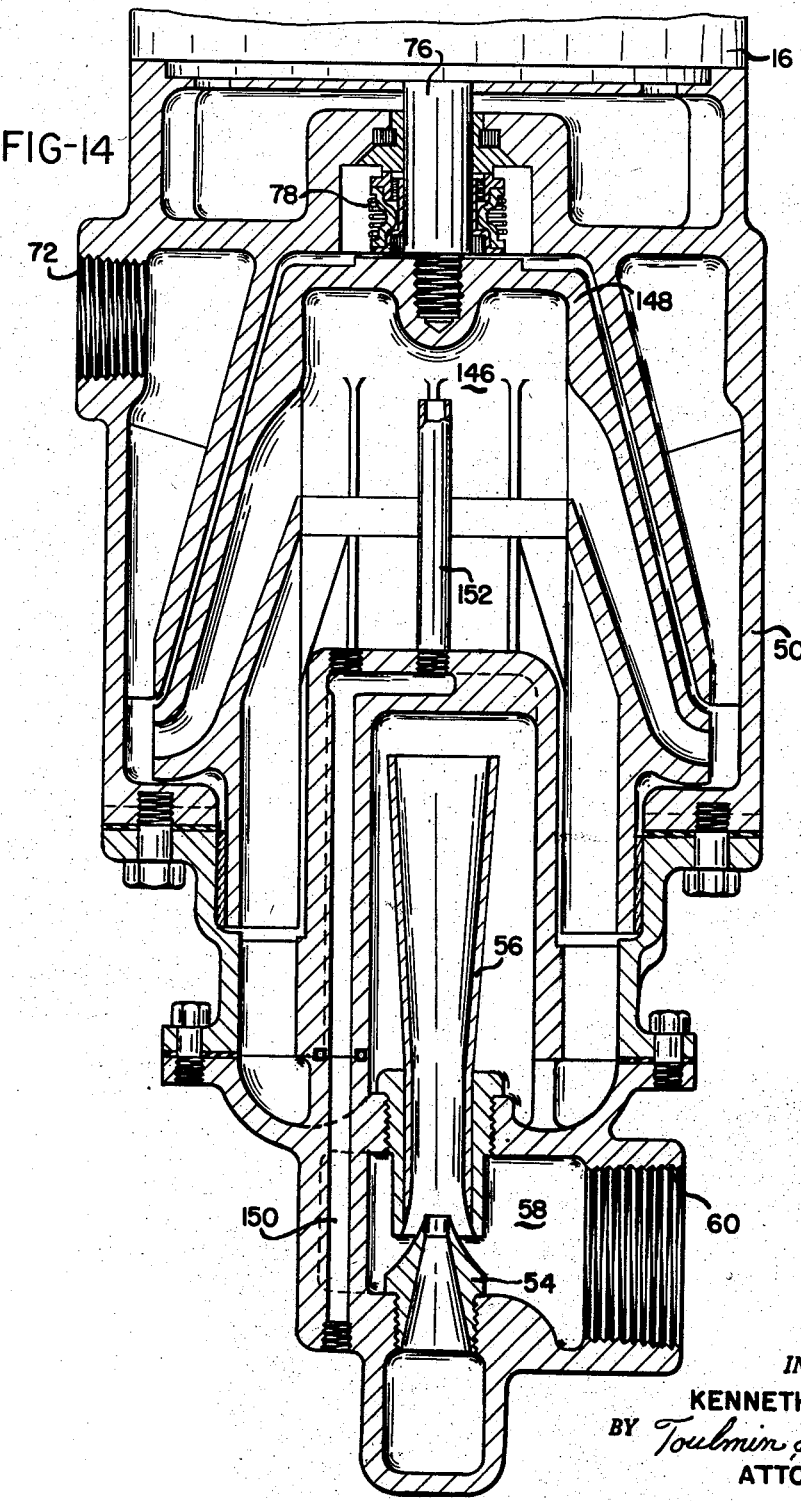

2,857,081

GAS SEPARATING AND PUMPING DEVICES

Kenneth R. Lung, Dayton, Ohio, assignor to The Tait Manufacturing Company, a corporation of Ohio Application February 9, 1953, Serial No. 335,823

11 Claims. (Cl. 222—255)

This invention relates to pumping devices and methods of operation thereof, particularly to devices and methods for simultaneously pumping liquids while separating entrained gases therefrom, especially with the pumping mechanism and the air separating mechanism combined in a single unit. In a particular sense, the present invention relates to a method and apparatus for pumping fluids, such as gasoline, while simultaneously separating entrained air therefrom and extracting the entrained air.

In the pumping of fluids it is often the case that air or gas is entrained in the fluid being pumped, or becomes entrained therein during the pumping operation, or dissolved gases are released therefrom. In certain instances, it is either desirable or essential to effect a separation of the pumped fluid from such free gases and the present invention has, as its foremost objective, the provision of an apparatus for and a method of accomplishing this separation of gases from liquids during pumping and the extraction of the separated gases from the fluid stream.

In connection with the dispensing of gasolines and the like, by computing dispensers of the nature that are found in service stations the separation of the gases from the gasoline is an absolute necessity in order to insure accurate measuring of the gasoline being dispensed by the computer meter. Because of the extremely stringent requirements connected with the pumping and dispensing of gasoline, it has been the practice heretofore to employ a substantially constant delivery pump such as a gear pump for driving the gasoline into the meter of the computer. Inasmuch as the rate of dispensing fluid will vary widely, a constant delivery pump of this nature is necessarily bypassed by a relief valve so that excess pump delivery can be discharged back to the supply reservoir or back to the inlet of the pump. Pumps of this nature are extremely noisy, particularly when a relief valve is associated therewith which bypasses a part of the pump delivery. Accordingly, it would be preferable to employ a centrifugal pump for the pumping of gasoline in order to obtain quietness of operation while eliminating the need for the bypassing relief valve and the noise attendant thereto because of the inherent variable delivery characteristics of a centrifugal pump. However, centrifugal pumps in the past have been at fault for this type of service in that any air that was entrained in the gasoline was broken up and admixed therewith and driven through the meter of the computer with the gasoline thus leading to faulty indications of the quantity dispensed. No suitable air separating means has been devised for use in connection with a centrifugal pump of this nature because the length of time that is required for the air to completely separate from the gasoline under solely gravitational influences requires such a large air separation chamber as to render such a scheme wholly impractical.

Having the foregoing in mind, it is another foremost objective of the present invention to provide an arrangement whereby entrained gases can be separated from liquid that is being pumped by a cetrifugal pump effciently and effectively and without there being required any large auxiliary air separation chamber.

Another particular object of this invention is the provision of a pumping system for a gasoline dispensing pump which is quiet in operation and not expensive to construct, and which insures an air-free supply of gasoline to the meter of the dispensing computer.

In brief, the objects of this invention referred to above, as well as still other objects and advantages, are attained by moving fluid to be pumped through a centrifugal pump in rotary motion as it approaches the eye of the impeller of the centrifugal pump whereby gases entrained in the fluid will migrate toward the axis of rotation of the fluid and substantially gas-free fluid will be delivered in an annular layer to the centrifugal pump impeller. By extracting the gas or air that is delivered to the said axis, a continuous supply of gas-free fluid is delivered to the centrifugal pump impeller so that the discharge from the centrifugal pump is likewise entirely free of gas.

A preferred manner of effecting the rotary movement of the fluid to be pumped as it approaches the eye of the impeller is to provide the inlet side of the impeller with a projecting portion within which are disposed substantially axially extending vanes whereby the fluid is driven at the same rotational speed as the impeller and in the same direction as it approaches the impeller. The inlet ends of said axially extending vanes are preferably curved in the direction of rotation of the impeller so that they will pick the fluid up and accelerate it before it enters the region where the axial portions of the vanes are located. In this last case, the combination is essentially one of an axial flow impeller, a centrifugal or radial flow impeller, and a section connecting the outlet side of the axial impeller with the inlet side of the radial impeller along which the fluid moves in straight axial flow relative to the impeller and which can be referred to as a gas separation section.

The advantage of bringing about the rotary movement of the fluid by the impeller itself is that the radial acceleration of the fluid reaches extremely high values, increasing the apparent density of the fluid but without any substantial change in the viscosity thereof, whereby there is created a strong buoyant effect on gas bubbles which urges the bubbles inwardly toward the axis of rotation of the fluid.

According to one modification of this invention, the entire work of setting the fluid into motion circumferentially is accomplished by means connected with the impeller, while in another modification the fluid is given an initial rotational component about the axis of rotation of the impeller as it approaches the impeller whereby less acceleration of the fluid in a rotary direction is necessary by the said means connected with the impeller.

The several objects and advantages referred to above, as well as still other objects and advantages, will become more fully understood in connection with the accompanying drawings, in which:

Figure 3 is a front elevational view, with parts broken away and in section, showing a further embodiment of the present invention;

Figure 4 is a fragmentary view showing the fluid connections that obtain in any one of the pumping and air separating systems of Figures 1 through 3;

Figure 5 is a vertical sectional view through one of the preferred forms which, according to my invention, a pumping and air separating unit can take;

Figure 6 is a top view, partly in section and partly in elevation, of the impeller shown in Figure 5;

Figure 7 is a vertical sectional view indicated by line 7—7 on Figure 6;

Figure 8 is a sectional view indicated by line 8—8 on Figure 7;

Figure 9 is a perspective view, partly in section and partly in elevation, of the lower portion of the impeller shown in Figure 7;

Figure 10 is a view similar to Figure 5, but shows a somewhat modified arrangement of the pumping and air separting unit in which the jet pump is arranged horizontally rather than vertically;

Figure 12 is a sectional view in developed form taken generally along line 12—12 of Figure 11;

Figure 14 is a sectional view similar to the Figure 11 arrangement, but showing still another form which the invention can take, particularly in connection with the extraction of air from the unit.

Figure 1:
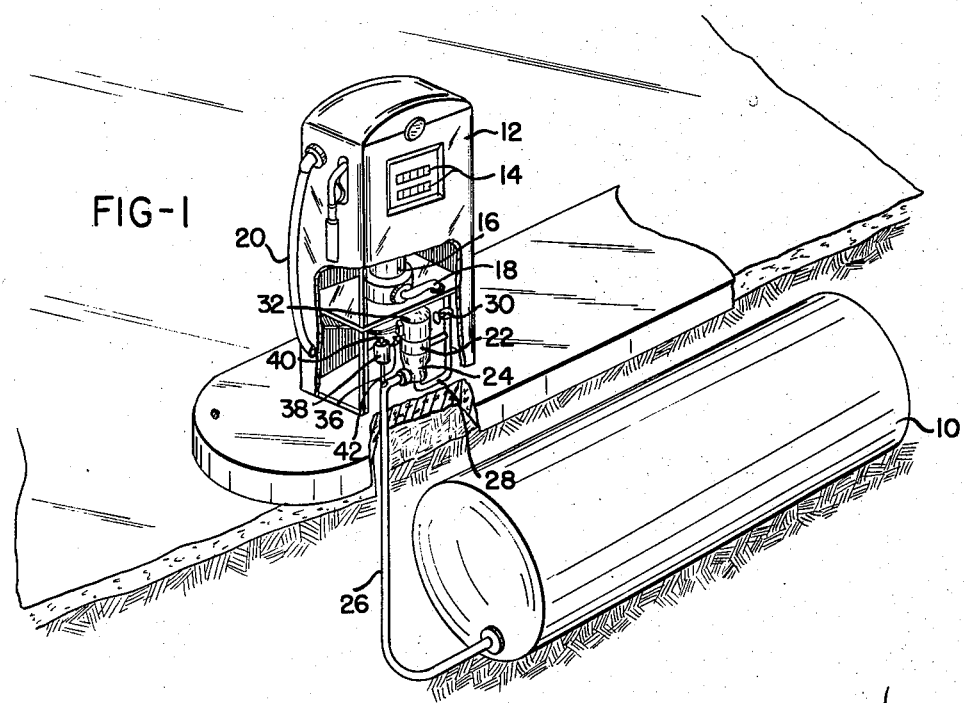
Figures 1 and 2 are perspective views, partly in section and partly in elevation, illustrating the present invention incorporated in gasoline dispensing systems.

Referring to the drawings somewhat more in detail and particularly to Figure 1, there is illustrated therein a typical arrangement for dispensing gasoline in a service station from an underground tank 10. The dispensing mechanism is indicated at 12 and comprises a price and quantity indicator mechanism 14 driven by a meter 16 that is supplied with gasoline by a conduit 18, with the gasoline discharged from the meter to a dispensing hose 20.

Conduit 18 leads to the discharge side of a centrifugal pump 22 that is supplied with fluid by a jet pump 24 that has its suction side connected by conduit 26 with tank 10.

Pressure fluid for the jet pump is derived from the discharge side of centrifugal pump 22 by way of conduit 28, with the discharge pressure of the centrifugal pump being controlled by valve 30 in the conduit 18 downstream from its connection with conduit 28.

An electric drive motor 32 provides the power for driving centrifugal pump 22 and may be controlled by the hook on which the nozzle of the dispensing hose 20 hangs, according to well known practices.

As will be explained more fully hereinafter, an air bleed conduit 34 having therein a control valve 36 leads from pump 22 to an air separation chamber 38 having an outlet 40 in its upper end opening to the atomsphere and a fluid controlled liquid outlet in its lower end connected by conduit 42 with suction conduit 26.

Figure 2:
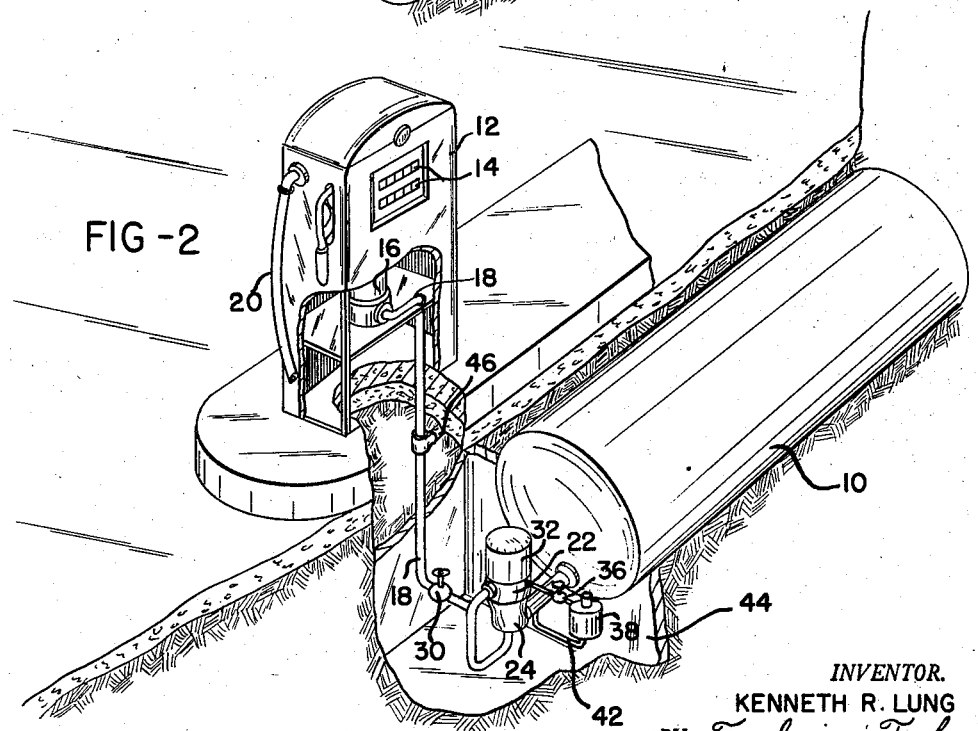

In Figure 2 substantially the same arrangement is illustrated, except that the pumping and air separation unit is disposed in a pit 44 provided at the end of tank 10, and this arrangement permits the dispensing computer unit 12 to be made smaller than usual and likewise eliminates whatever noise obtains in connection with the operation of the pumping and air separating unit.

The Figure 2 arrangement also permits the pipe 18 leading to meter 16 to have one or more branches as at 46 leading to other dispensing computer mechanisms so that a single pump and air separating unit can be employed for a number of dispensers.

In Figure 3 I show a still further modified arrangement wherein the jet pump 24 is positioned within pit 44 while the centrifugal pump 22 and drive motor 32 are positioned within the housing of the dispensing computer.

Turning now to Figure 4, there is shown therein somewhat more in detail the construction of the air separating chamber 38 and the connections between centrifugal pump 22 and the jet pump 24.

With regard to the air separation chamber 38 the liquid outlet port at the bottom that is connected with conduit 42 is controlled by valve 46 that is, in turn, controlled by float 48. Control valve 36 in conduit 34 is provided for regulating the rate of discharge into chamber 38 and may include means such as a check valve to prevent reverse flow in conduit 34 toward centrifugal pump 22.

In Figure 5 there is illustrated, more or less in detail, the physical construction of one preferred form which the fluid pumping and air separating mechanism, according to my invention, can take, although it will be understood that certain portions of Figure 5, as well as the other detailed drawings in this application, will more or less be diagrammatic in certain non-essential details.

In Figure 5 the unit illustrated comprises a casing part 50 and a casing part 52 that are connected together to form the casing for the entire unit. Mounted within casing part 50 is an ejector 54 that delivers to the venturi 56, the inlet of which communicates via chamber 58 with the inlet port 60 of the casing to which the suction conduit 26 is connected.

The upper wall of casing part 50 has its central part formed downwardly, and in the center is an aperture for receiving the upper end of venturi 56.

Casing part 52 has a central recess therein at 62 within which is mounted the rotary member 64, the upper portion of which, from the dot-dash lines 66, outwardly consists of a substantially conventional centrifugal impeller. Casing part 52 has an annular cavity 68 into which the impeller discharges and this cavity communicates by way of passage means 70 with outlet port 72 to which discharge conduit 18 is connected. Cavity 68 also communicates through port 74 with the interior of casing part 50 for supplying fluid under pressure to ejector 54.

Rotary member 64 is driven in rotation by shaft 76 extending from drive motor 16 through a rotary seal 78 which may be of conventional design.

According to the present invention the lowermost section of the part of rotary member 64, indicated at 80, consists of a plurality of vanes 82 which are generally curved in the direction of rotation of the rotary member so that fluid delivered to the lower end of the rotary member from venturi 56 will be picked up and accelerated in the direction of rotation of the rotary member. The uppermost portions of vanes 82 merge with the axial vanes 84 in the center section of the rotary member 64, and a deflector 85 extends between the radially inward edges of vanes 82 and is closed at its upstream end to direct all of the liquid between the vanes 82. An open central air separating section is thus provided downstream of deflector 85, defined by the upper edge of the deflector member and the radially inward edges of vanes 84, the location of such air separating section being generally indicated at 86 in Figure 7.

At its upper end cavity 86 communicates through aperture 88 and diagonal bores 90, with chamber 92 surrounding rotary seal 78 and chamber 92 communicating with the air discharge conduit 34 either directly through passage 94 or through auxiliary chamber 96 in casing member 52, whichever is the more convenient.

The construction of the rotary member 64 will be more clearly seen on reference to Figures 6 through 9, wherein it will be noted that the vanes 82 at the lower part of the member, and which make up the axial flow impeller, have their lower ends curved relatively sharply in the direction of the rotation of the member and their upper ends substantially vertical so as to merge with the vanes 84 along the air separating section of the rotary member.

It will also be noted that there are more vanes in the centrifugal impeller section than there are in the axial impeller section or in the air separating section of the rotary member, and because of this some of the vanes of the centrifugal impeller section merge with the vanes of the air separating section, while others thereof terminate at that point of the impeller section that would properly be referred to as the eye thereof.

In Figure 10, there is shown an arrangement substantially identical with the one illustrated in Figure 5, except that the venturi 100 in Figure 10 is arranged to discharge horizontally into chamber 102 which opens vertically into the lower end of the rotary member 104. An advantage which obtains for the Figure 10 construction is that the high velocity core set up in venturi 100 by the injector 106, which high velocity jet might tend to create turbulence or channelling of the fluid in passing through the rotary member, is broken up and deflected within chamber 102 so that all of the fluid enters rotary member 104 at substantially the same velocity.

Still another feature illustrated in Figure 10 is the provision of the inwardly projecting portion 104 immediately preceding the eye of the centrifugal impeller section of the rotary member, and which projection causes the fluid passing through the rotary member to have an inward component which tends to assist in separating the air therefrom that is withdrawn through the air discharge passage.

Figure 11:
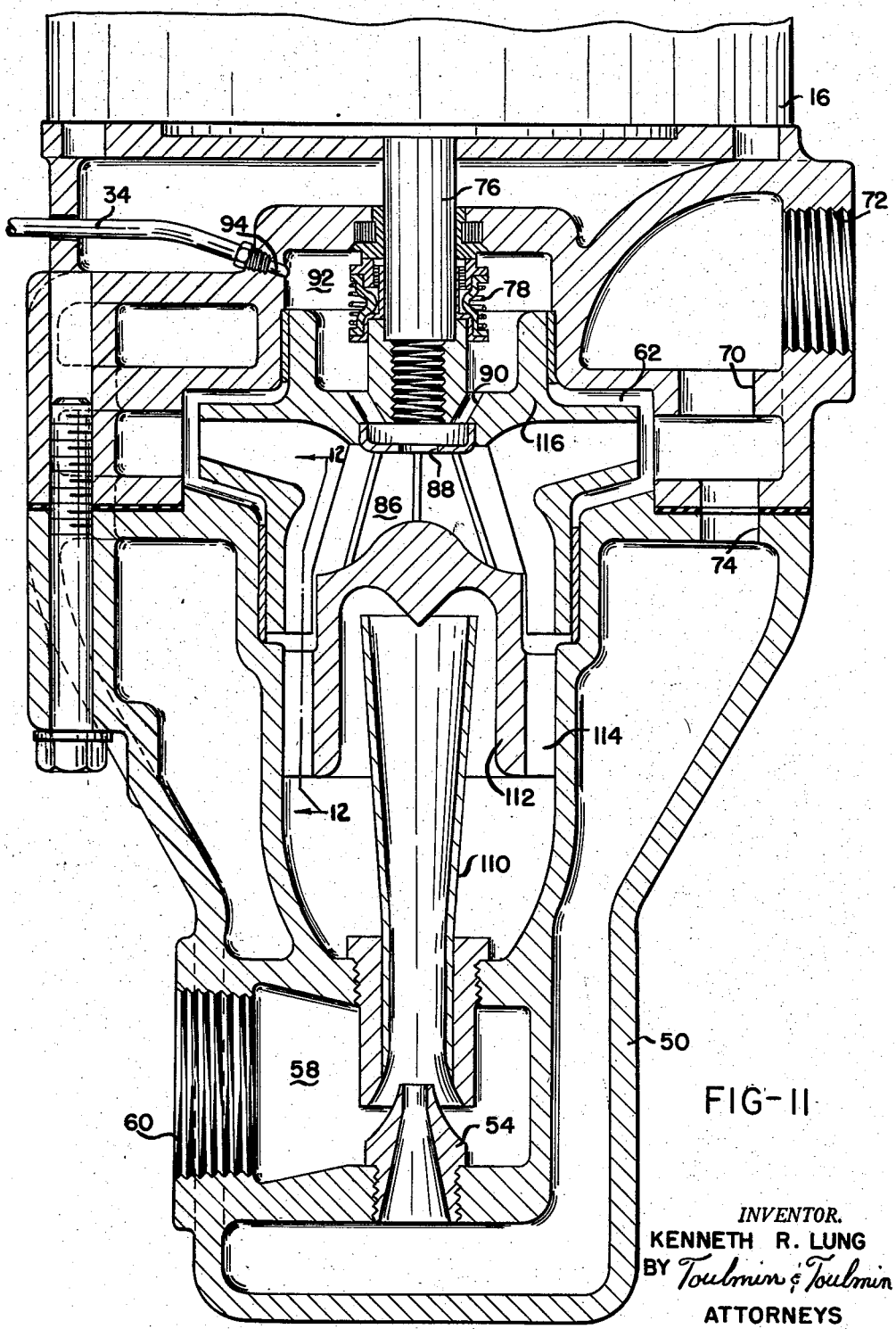
Figure 11 is a vertical section taken through another modified form of the invention.

In the Figure 11 modification an arrangement is illustrated which is similar to the Figure 5 modification, except that in Figure 11 the venturi 110 is arranged to discharge into an inverted cup arrangement 112 forming a part of the lower casing member. The fluid supplied by the venturi flows downwardly within the cup and then passes upwardly between the vanes 114 to enter the lower end of rotary member 116 and which comprises, as in the case of the modification described previously, a lower axial impeller section, an air separating section, and an upper centrifugal impeller section.

Another feature of the Figure 11 construction resides in the vanes 114 which, as will be seen in Figure 12, are curved in the direction of rotation of rotary member 116 so that the fluid which enters the lower open end of the rotary member has an initial component of rotation which permits the vanes 118 at the lower end of the rotary member to be arranged at somewhat less of an inclination than would be the case if the fluid were moving in a straight axial direction at the time of entering the rotary member. The initial rotary movement of the fluid imparted thereto by the vanes 114 also permits the picking up of the fluid by the rotary member with a minimum of turbulence being imparted to the fluid whereby highly efficient operating conditions obtain.

Figure 13:
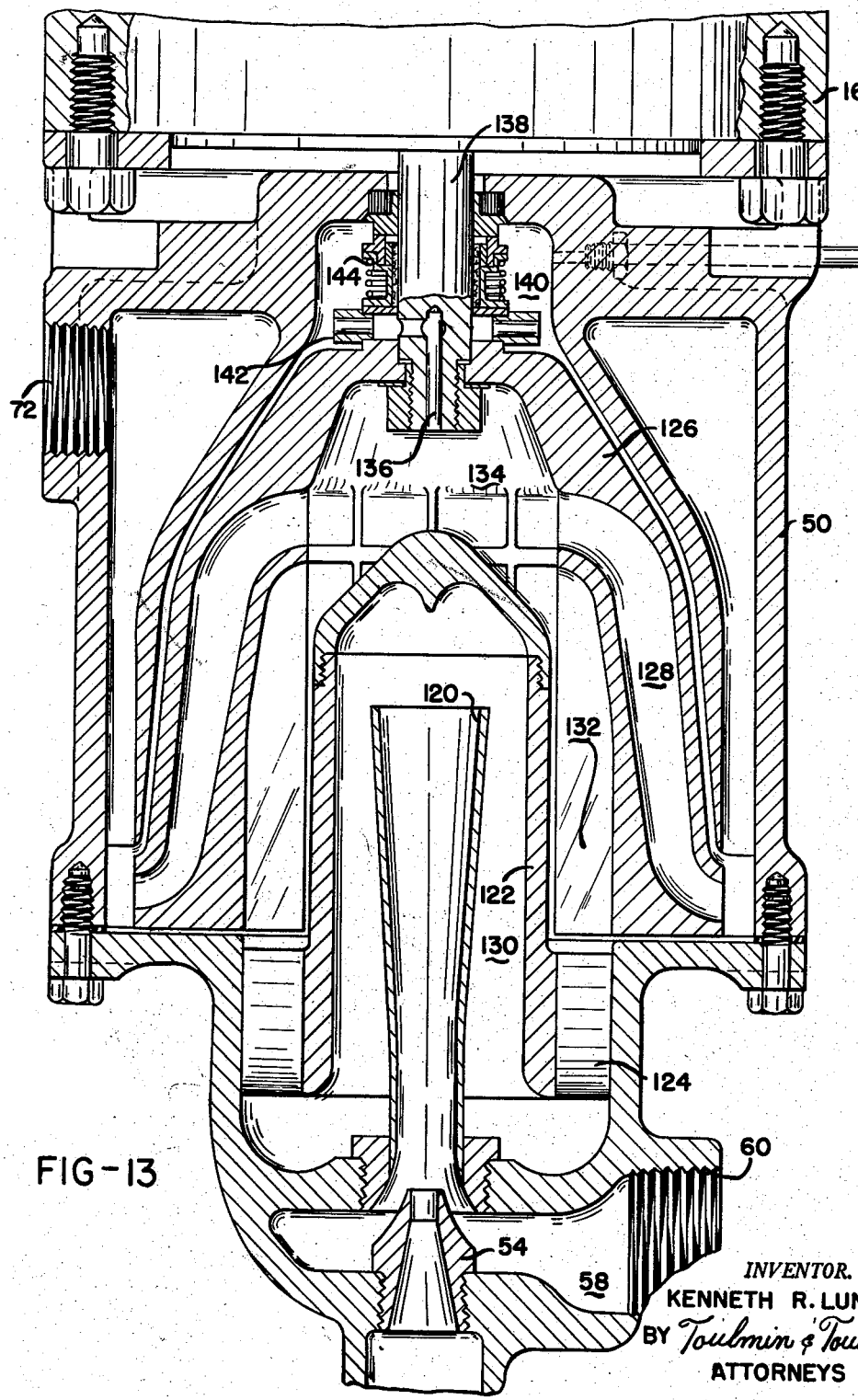
Figure 13 is a vertical sectional view similar to Figure 11, but showing a somewhat modified form of this invention.

In Figure 13 a still further modification is illustrated somewhat in the same manner as the Figure 11 modification, with the venturi 120 discharging into the upper end of inverted cup portion 122 from the lower end of which fluid passes through the spiral vanes 124 into the lower open end of rotary member 126.

The rotary member 126 in Figure 13 is arranged so that the centrifugal impeller section 128 thereof is telescopically arranged about the axial impeller section 130 and air separating section 132 thereof. In this modification the fluid being pumped is directed into the central air receiving cavity 134 from the upper end of the air separating section so that highly efficient separation of the air or gas from the fluid obtains.

The air discharge passage in Figure 13 is provided by the bore 136 in drive shaft 138 which communicates with chamber 140 through the radially drilled ring 142 on which rests the rotary seal 144.

The Figure 14 arrangement is substantially identical with the one illustrated in Figure 13, except as to the manner of withdrawing air from the central cavity 146 of the rotary member 148. In Figure 14 a passage 150 is provided extending through the casing of the unit from the inlet end thereof, and which passage communicates by means of conduit 152 with cavity 146 in the region of the upper end of the cavity adjacent the eye of the centrifugal impeller section of the rotary member. This construction has the advantage of eliminating the necessity for drilling the drive shaft or of providing special cored or drilled passages in the upper end of the rotary member and the casing of the unit.

*Operation*

The operation of all the different forms of the invention illustrated is substantially the same. In each case fluid is supplied under pressure to the rotary member, and either with or without a rotary component of movement in the direction of rotation of the rotary member.

The fluid, upon being picked up by the rotary member, is driven axially therein while simultaneously being set into rotary motion at the same speed as the rotary member is rotating and is guided axially through the central air separating section of the member.

Assuming, for example, that the rotary member is rotating at 3500 revolutions per minute, a substantial centrifugal force is developed on the fluid passing along the air separating section which substantially increases its apparent density whereby a strong buoyant effect is had upon gas bubbles in the fluid tending to urge them toward the axis of rotation of the member. The path taken by such bubbles is an upward and inwardly spiral path, and the length of the air separation section of the rotary member is so calculated that sufficient time is available during the travel of the fluid therealong to permit the smallest bubbles that it is desired to remove from the fluid to migrate inwardly from the most unfavorable portion into the air collecting zone at the center of the rotary member.

By adjusting the rate of air flow along the air discharge passage means to the external air separation chamber a continuous supply of gas free liquid is insured for the centrifugal impeller. Inasmuch as the air in the center of the rotary member will contain some fluid and, in fact, the fluid and air will exist in this zone in the form of a froth, some liquid will be, and preferably is, discharged along with the air. This discharge of fluid along with the air represents a loss of efficiency of pumping action, but by regulating the rate of discharge to the external air separation chamber, this loss can be kept at a substantially negligible level.

It will be understood that this invention is susceptible to modification in order to adapt it to different usages and conditions, and, accordingly, it is desired to comprehend such modifications within this invention as may fall within the scope of the appended claims.

I claim:

1. Apparatus for pumping volatile liquids and the like comprising the combination of a centrifugal impeller adapted to deliver liquid under pressure to a metering device, a supply source of relatively volatile liquid, pump means connected to said supply source and to the inlet of said impeller for pumping the liquid under pressure to said impeller, separator means including at least one curved vane extending axially of the connection between said pump means and said impeller inlet to impart a swirling motion to the liquid under pressure passing to said inlet and to centrifuge the liquid and separate entrained gases in the liquid from the more dense substantially gas-free ends thereof, and means connecting said inlet of said impeller to a part of the apparatus at atmospheric pressure to conduct the separated gases from the impeller and provide for pumping of substantially gas-free liquid to the metering device.

2. Apparatus for pumping volatile liquids and the like comprising the combination of a centrifugal impeller adapted to deliver liquid under pressure to a discharge conduit, a jet pump connected to deliver liquid under pressure from a supply pipe to the inlet of said impeller and including an ejector connected to the outlet of said impeller to supply actuating liquid under pressure to said jet pump, a plurality of vanes extending axially between the outlet of said jet pump and the inlet of said impeller for imparting a rotary motion to the liquid passing through said vanes and centrifuging entrained gases from the liquid and to supply substantially gas-free liquid to the pumping vanes of said impeller, and means connecting the inlet of said impeller to a part of the apparatus at atmospheric pressure to conduct said entrained gases away from said impeller and to provide for pumping of substantially gas-free liquid to the discharge conduit.

3. Apparatus for pumping volatile liquids and the like comprising the combination of a jet pump having an inlet adapted for connection to a source of volatile liquid, a centrifugal impeller adapted to deliver liquid under pressure to a metering device, said impeller including an inlet connected to receive liquid under pressure from the outlet of said jet pump, said jet pump including an ejector connected to the outlet of said impeller to supply actuating liquid under pressure to said jet pump, a plurality of vanes extending axially between the outlet of said jet pump and the inlet of said impeller adapted to swirl the liquid under pressure passing from said jet pump to centrifuge the liquid and concentrate the more dense parts thereof adjacent peripheral portions of said vanes, and means for conducting the entrained gases separated from said liquid and collecting centrally of said vanes to a part of the apparatus at atmospheric pressure to provide for pumping of substantially gas-free liquid to the metering device.

4. Apparatus for pumping volatile liquids and the like comprising the combination of a centrifugal impeller adapted to deliver liquid under pressure to a discharge conduit, a jet pump connected to deliver liquid under pressure from a supply pipe to the inlet of said impeller and including an ejector connected to the outlet of said impeller to supply actuating liquid under pressure to said jet pump, at least one stationary curved vane extending axially between the outlet of said jet pump and the inlet of said impeller for imparting a rotary motion to the liquid forced against said vane by said jet pump to centrifuge the liquid passing said vane and collect the gases entrained in the pumped liquid centrally of the inlet of said impeller, and means connecting the inlet of said impeller to a part of the apparatus at atmospheric pressure to conduct the entrained gases away from said impeller and to provide for pumping of substantially gas-free liquid to the discharge conduit.

5. Apparatus for pumping volatile liquids and the like comprising the combination of a centrifugal impeller adapted to deliver liquid under pressure to a metering device, a jet pump connected to deliver liquid under pressure from a supply pipe to the inlet of said impeller and including an ejector connected to the outlet of said impeller to supply actuating liquid under pressure to said jet pump, a plurality of curved vanes extending axially between the inlet of said impeller and the outlet of said jet pump and adapted for rotation with said impeller, said vanes being curved away from said impeller about the axis thereof in a direction corresponding to the rotation of said vanes to minimize turbulence in the liquid passing from said jet pump to said impeller and to centrifuge entrained gases from the liquid, and means connecting the eye of said impeller to a part of the apparatus at atmospheric pressure to conduct said entrained gases away from said impeller and to provide for pumping of substantially gas-free liquid to the discharge conduit.

6. In a centrifugal action-type separator for use in a system for pumping and dispensing volatile liquids and the like, the combination of pumping means adapted for connection to a source of volatile liquid, means connected to the outlet of said pumping means for swirling the liquid under pressure to centrifuge entrained gases therefrom and to concentrate substantially gas-free liquid in surrounding relation to a core of said gases, and means for conducting the gases away from a point adjacent the center of said swirling means to a part of the system at atmospheric pressure to provide for delivery of substantially gas-free liquid from the separator.

7. In a centrifugal action-type separator for use in a system for pumping and dispensing volatile liquids and the like, the combination of a jet pump adapted for connection to a source of volatile liquid, means connected to the outlet of said jet pump for swirling the liquid under pressure to centrifuge entrained gases therefrom and to concentrate substantially gas-free liquid in surrounding relation to a core of said gases, and means for conducting the gases away from a point adjacent the center of said swirling means to a part of the system at atmospheric pressure to provide for delivery of substantially gas-free liquid from the separator.

8. In a centrifugal action-type separator for use in a system for pumping and dispensing volatile liquids and the like, the combination of a jet pump adapted for connection to a source of volatile liquid, a plurality of curved stationary vanes supported axially of the outlet of said jet pump for swirling the liquid under pressure to centrifuge entrained gases therefrom and to concentrate the more dense parts of the liquid in surrounding relation to a core of said gases, and means for conducting the gases away from said separator to a part of the system at atmospheric pressure to provide for delivery of substantially gas-free liquid from the separator.

9. In a centrifugal action-type separator for use in a system for pumping and dispensing volatile liquids and the like, the combination of a jet pump adapted for connection to a source of volatile liquid, a plurality of curved vanes arranged to receive the output of said jet pump and swirl the liquid under pressure to centrifuge entrained gases therefrom, a deflector member extending centrally of said vanes along a portion of the length thereof adjacent said outlet of said jet pump, said deflector member and said vanes defining an open central air separating section downstream of said deflector for receiving the gases separated from the pumped liquid, and means for conducting the gases from said separating section to a part of the system at atmospheric pressure to provide for delivery of substantially gas-free liquid from the separator.

10. In a gasoline pumping system the combination of a dispenser, a storage tank, a centrifugal impeller connected to deliver gasoline under pressure from said tank to said dispenser, pump means connected between said tank and the inlet of said impeller for pumping gasoline under pressure to said impeller, separator means including at least one curved vane extending axially of the connection between said pump means and said impeller inlet to impart a swirling motion to the gasoline under pressure passing to said inlet and to centrifuge the gasoline and separate entrained gases in the gasoline from the more dense substantially gas-free ends thereof, and means connecting said inlet of said impeller to a part of the system at atmospheric pressure to conduct the separated gases from the impeller and provide for pumping of substantially gas-free gasoline to said dispenser.

11. In a gasoline pumping system the combination of a dispenser, a storage tank, a centrifugal impeller connected to deliver gasoline under pressure from said tank to said dispenser, a jet pump connected to deliver gasoline under pressure from said tank to the inlet of said impeller and including an ejector connected to the outlet of said impeller for actuating said jet pump, a plurality of vanes extending axially between the outlet of said jet pump and the inlet of said impeller for imparting a rotary motion to the gasoline passing through said vanes and centrifuging entrained gases from the gasoline to supply substantially gas-free gasoline to the pumping vanes of said impeller, and means connecting the inlet of said impeller to a part of the system at atmospheric pressure to conduct said entrained gases away from said impeller and to provide for pumping of substantially gas-free gasoline to said dispenser.

References Cited in the file of this patent

UNITED STATES PATENTS

| | | |
|---|---|---|
| 1,817,041 | Singleton | Aug. 4, 1931 |
| 1,948,543 | Samiran | Feb. 27, 1934 |
| 2,007,197 | Hedblom | July 9, 1935 |
| 2,061,013 | Wade | Nov. 17, 1936 |
| 2,164,441 | Bechtold | July 4, 1939 |
| 2,259,771 | Oberly | Oct. 21, 1941 |
| 2,291,138 | Blom | July 28, 1942 |
| 2,306,841 | Adams | Dec. 29, 1942 |
| 2,307,060 | Moore et al. | Jan. 5, 1943 |
| 2,307,085 | Trexler | Jan. 5, 1943 |
| 2,375,571 | Mann | May 8, 1945 |
| 2,474,539 | Mann | June 28, 1949 |
| 2,648,496 | Creasswell | Aug. 11, 1953 |
| 2,649,051 | Ericson | Aug. 18, 1953 |
| 2,693,148 | Doelter | Nov. 2, 1954 |
| 2,710,664 | Blackmore et al. | June 14, 1955 |
| 2,712,897 | Kusserow | July 12, 1955 |